G. T. PARR.
COLLAPSIBLE FAN TRELLIS.
APPLICATION FILED MAY 27, 1918.
1,311,136.
Patented July 22, 1919.
2 SHEETS—SHEET 1.
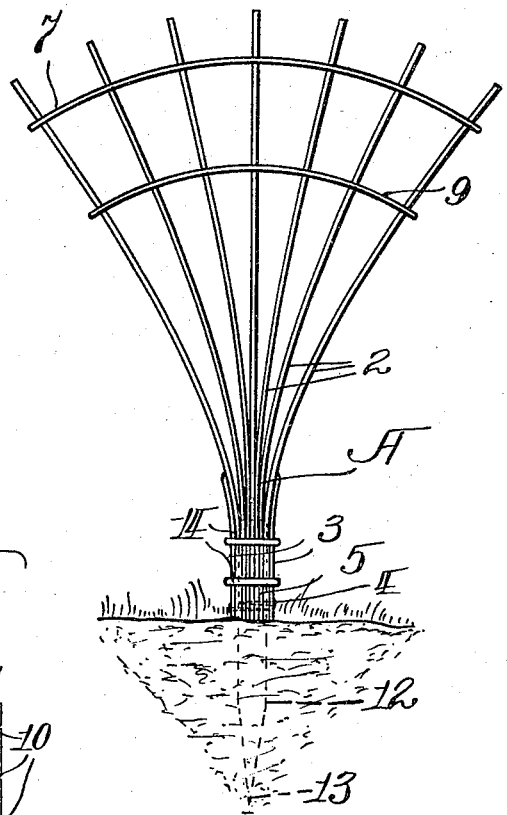
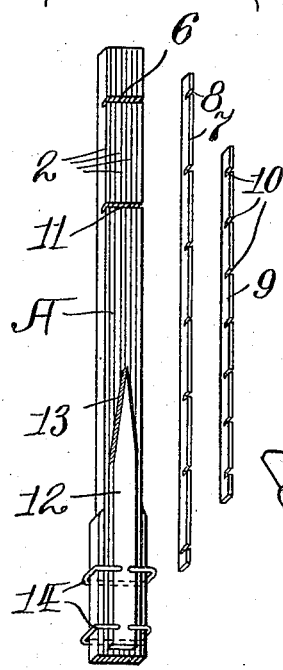
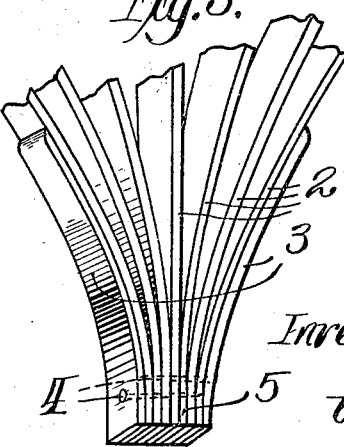
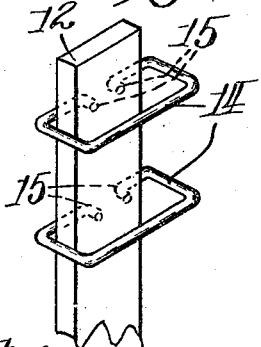
Inventor:
George T. Parr,
by: [signature],
Attorney.

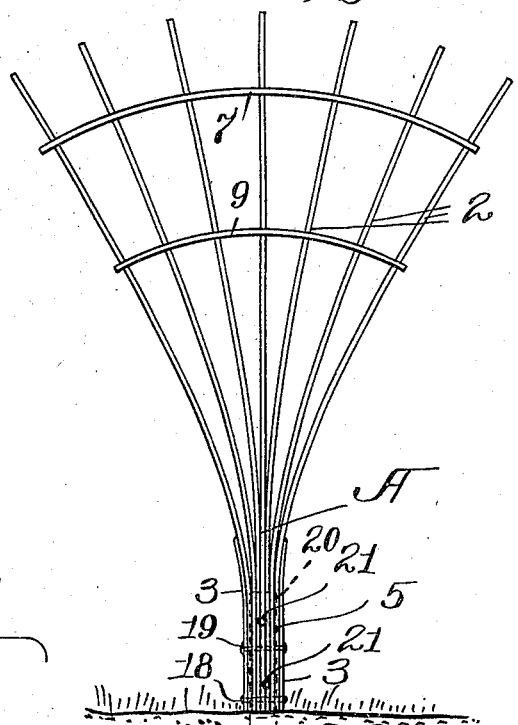
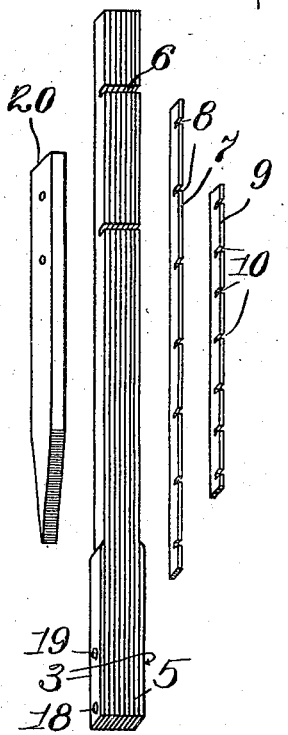
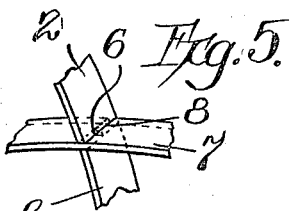

UNITED STATES PATENT OFFICE.

GEORGE T. PARR, OF ST. PAUL, MINNESOTA.

COLLAPSIBLE FAN-TRELLIS.

1,311,136.     Specification of Letters Patent.     Patented July 22, 1919.

Application filed May 27, 1918. Serial No. 236,947.

*To all whom it may concern:*

Be it known that I, GEORGE T. PARR, a citizen of the United States, residing at St. Paul, in the county of Ramsey and State of Minnesota, have invented a new and useful Improvement in Collapsible Fan-Trellises, of which the following is a specification.

My invention relates to a collapsible trellis which is particularly adapted for garden use having an artistic design or shape when in use, and provided with means whereby it can be collapsed and stored away in a very small space. The construction of my trellis is very simple and inexpensive to manufacture being provided with a detachable stake, thus affording the easy positioning of the trellis in any desired place without injury to the artistic elements of the same.

The collapsing feature of the trellis allows the same to be packed easily for carrying or shipment, giving a package of small dimensions, a feature which is desirable to the merchant or customer. The detachable stake provides a device which is considerably shorter than it would necessarily have to be if the stake were formed in continuation of the body portion of the trellis and this feature allows the stake to be driven into the ground where it is desired to set up the trellis before the body of the same is attached to the stake.

It is a feature of the invention to provide means of construction to prevent the breaking off of the flexible elements of the body portion of the trellis during the setting up of the same. This feature is very important in a practical device, and has heretofore caused a great deal of trouble in collapsible trellis constructions.

In the accompanying drawings forming part of this specification:

Figure 1 is a front elevation of my trellis as it would appear when in use.

Fig. 2 is a perspective view of the trellis in collapsed position showing the spacing bars alongside of the same.

Fig. 3 illustrates a perspective view of a detail portion of the trellis.

Fig. 4 illustrates, in perspective, a detail of a portion of the trellis.

Fig. 5 illustrates a detail portion of the trellis.

Fig. 6 illustrates a detail portion of the trellis partly in section.

Fig. 7 is a front elevation of an alternative construction of my trellis.

Fig. 8 is a perspective view of the alternative construction of the trellis in collapsed position with the stake and spacing parts positioned on either side of the same.

In the drawing A represents a trellis which is formed with a body portion composed of a series of thin flat flexible members 2. The members 2 are formed of any suitable material with sufficient flexibility to allow them to be curved or bowed into the desired position, and are collectively held on one end between short flexible guards 3 by any suitable means, such as nails or screws 4 to form a base portion 5. The holding means 4 is preferably placed close to the lower end or extremity of the base portion 5, and hingedly holds the lower ends together the purpose of which will be hereinafter described.

The members 2 are formed with upper notches 6 near the upper free end in which a spacing bar 7 having notches 8 is adapted to fit and space the elements 2 in a spread out or fan shape position. The notches 8 formed in the member 7 are adapted to fit into the notches 6 formed in members 2 as illustrated in Figs. 5 and 6 and in this manner the edges of the members 2 and the member 7 lie flush with each other. This construction gives a neat appearance to the trellis A and is durable in use. A second spacing bar 9 is positioned below the spacer 7 and is formed with notches 10 which are similar to the notches 8 and which fit or engage in the notches 11 formed in the members 2. The spacing bar 9 adds to the artistic design of the trellis A and also strengthens the construction of the same.

The guards 3 are sufficiently flexible to allow the bars 2 to spread as illustrated in Fig. 3, when the spacing bars 7 and 9 are being attached to the bars 2, during the setting up of the trellis A and the holding means 4 preventing separation of the bars 2 at the base of the trellis. This construction allows the spreading of the bars 2 from the holding means 4 to the free ends without breaking them off above the side guards 3, and in this manner gives a feature which is important and valuable in a collapsible trellis construction.

A holding stake 12 having a sharp pointed end 13 is provided to detachably hold the trellis and is adapted to be driven into the ground at the place where it is desired to set up the same. The stake 12 has angular bands or clamps 14 formed with inturned engaging ends 15 which engage in sockets formed in the back of the stake 12 to hold the bands attached to the stake. The bands 14 engage against the guards 3, of the base of the trellis 5, when the trellis is slid into the same, compressing or drawing together the bars 2 to hold the base portion of the trellis A, under spring tension of the bars 2 in the clamps 14 and also holding the ends 15 in the sockets in the stake. Thus when the stake 12 has been driven into the ground and the bars 2 spread apart by the spacers 7 and 9 the base portion 5 is slid into the clamps or brackets 14, as illustrated in Fig. 1 and the bars 2 are squeezed together at the base portion sufficiently to hold the trellis in place without breaking the bars 2. The clamps or bands 14 are sufficient to rigidly hold the trellis fixed to the stake, still allowing it to be easily removed from the bands and collapsed if desired.

The construction of the stake 12 allows it to be easily detached from the body of the trellis and also allows the clamps 14 to be slid over the base portion 5 with the pointed end extending inwardly toward the body of the trellis A, as illustrated in the Fig. 2 when the trellis is collapsed. When the trellis A is collapsed the bars 2 will lie in the position illustrated in Fig. 2, and the bars 7 and 9 can be held to either side of the body of the trellis by slipping one end of each under the portions of the bands 14. Thus the trellis A can be collapsed into a small package which allows it to be easily carried when purchased or shipped.

The flat thin construction of the members 2 of the trellis A allow them to be bent or curved in one direction while they are rigid in the opposite direction. This construction of the members 2 gives a trellis A of sufficient rigidity to form a support for plants, etc., when in use. It is an important feature of the trellis A that the members 2 be spread apart and the spacing bars 7 and 9 secured thereto before the base 5 of the trellis is attached to the stake 12, to insure and guard against breaking of the members 2 while they are being spread apart.

Fig. 3 illustrates the members 2 spread apart clear down to the holding means 4, before the trellis has been inserted in the clamps 14, which compresses or squeezes the portion of the members 2 between the guards 3 together without breaking the same.

In the construction illustrated in Fig. 7 the base portion 5 of the trellis A is provided with the guards 3 on either side of the lower portion of the members 2 which are bound together by means of the bolts or screws 18 and 19.

The bolt 18 is positioned near the lower extremity and the bolt 19 being positioned above the bolt 18. In this construction the stake 20 is detachable from the body of the trellis and is driven into the ground before the base portion 5 of the trellis is attached to the same. The base portion 5 of the trellis illustrated in this construction is secured to the stake 20 by screws or other suitable means. In this construction the guards 3 project some distance above the bolt 19 and are sufficiently flexible to allow the members 2 to bend without breaking at a point above the base portion of the trellis when the same is being set up.

The trellis is easily collapsed and the spacing bars together with the stake 20 can be attached to the sides of the same in any suitable manner. The trellis when collapsed will appear as illustrated in Fig. 8, which illustrates the spacing bars 7 and 9 alongside of the body portion of the same.

When the trellis A is collapsed by removing from the stake 12, and removing the bars 7 and 9 the members 2 will tend to spring together into the position illustrated in Figs. 1 and 7, for this reason the bars 7 and 9 need only to be slipped into place in the notches or recesses in the members 2 as the spring tension of the members 2 is sufficient to hold them in place.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. In a collapsible trellis having a detachable stake, a series of thin flexible members hinged together on their lower extremity, recesses formed on one side near the upper free end of said members, a spacing bar having recesses formed therein for engaging in the recesses formed in said flexible members to space the free ends of said flexible members apart when in a spread out position and holding means on said stake for engaging the lower ends of said flexible members to draw said lower ends together parallel to and adjacent each other when said ends are slid into said holding means to rigidly hold said lower end of said trellis by their spring tension to said stake.

2. In a device of the class described, comprising a series of thin flat flexible members hinged together on one end with their flat surfaces lying adjacent each other, the upper ends of said members being free to be spread apart, spacing bars adapted to engage said upper free ends to hold them spread apart under the spring tension of said flexible members, a stake for detachably holding the hinged together ends of said device and means on said stake for engaging the hinged together ends to compress the same and hold them parallel to each other for the purposes specified.

3. In a trellis having a body portion formed of a series of thin, flat, flexible members, means for hingedly holding the lower extremities of said flexible members to form a base portion on said trellis, guards secured to the outer flexible members at their base portion, a stake for removably holding said base portion and clamping means for slidably engaging the base portion of said trellis to compress said flat flexible members into position extending parallel to each other at their base portion between said clamping means, causing said flexible members to be held in said clamping means under their own tension.

4. In a trellis having a body portion formed of a series of thin, flexible members, means for hingedly holding the lower extremities of said members together, means for spacing the free ends of said flexible members apart to form a fan shaped trellis, a stake having means for drawing the hinged ends of said flexible members together to lie parallel to each other at their hinging ends when it is in use as a trellis, said means being also adapted to engage the hinged together ends of said trellis when the same is collapsed to hold the stake, with its body portion adjacent and extending longitudinally with the body portion of the trellis and flexible members to hold the flexible members in a collapsed position parallel to each other.

5. In a trellis having a body portion formed of a series of thin, flexible members, means for hingedly holding one end of said members together, a stake for holding said trellis, and means on said stake for holding it with its body portion extending longitudinally with and adjacent the flexible members holding said flexible members parallel to each other, said holding means being adapted to hold the hinged together ends of said trellis compressed parallel between said holding means and allowing their free ends to be spread apart to form a fan shaped trellis.

6. In a trellis having a body portion formed of a series of thin, flat, flexible members, means for holding one end of said members hinged together to allow said members to be spread apart from their free ends to the hinging point, a stake for detachably holding the hinged together ends and loops on said stake for drawing the hinged together ends together so as to extend parallel to each other between said loops, said loops being adapted to hold said stake with its body portion extending with and against the body portion of the flexible members when the same are collapsed, said loops holding said members collectively when collapsed and in a compact state.

GEORGE T. PARR.

Copies of this patent may be obtained for five cents each, by addressing the "Commissioner of Patents, Washington, D. C."